United States Patent [19]
Saita et al.

[11] Patent Number: 5,663,782
[45] Date of Patent: Sep. 2, 1997

[54] PHOTOGRAPHIC PRINTER AND FILM SCANNER HAVING AN LED LIGHT SOURCE

[75] Inventors: Hirofumi Saita; Kenji Suzuki; Shuji Tahara; Takaaki Terashita; Hiroshi Sunagawa, all of Kanagawa, Japan

[73] Assignee: Fuji Photo Film Co., Ltd., Kanagawa, Japan

[21] Appl. No.: 427,840

[22] Filed: Apr. 26, 1995

[30] Foreign Application Priority Data

Jul. 8, 1994 [JP] Japan ................... 6-157632

[51] Int. Cl.$^6$ .................... G03B 27/00; G03B 27/72
[52] U.S. Cl. .................. 355/37; 355/69; 355/70
[58] Field of Search .................. 355/35, 37, 38–41, 355/20, 70, 69; 358/302, 527; 382/112; 364/525; 362/231; 347/236; 356/404, 443, 444

[56] References Cited

U.S. PATENT DOCUMENTS

| | | | |
|---|---|---|---|
| 4,806,965 | 2/1989 | Yamanouchi et al. | 355/41 Y |
| 4,875,071 | 10/1989 | Shiota | 355/20 |
| 5,036,402 | 7/1991 | Shiota | 355/70 Y |
| 5,122,831 | 6/1992 | Suzuki | 355/37 |
| 5,214,468 | 5/1993 | Seto | 355/41 |
| 5,255,171 | 10/1993 | Clark | 362/231 |
| 5,515,136 | 5/1996 | Nishio et al. | 355/37 |

FOREIGN PATENT DOCUMENTS

43 08 864  1/1994  Germany.
57-179832  11/1982  Japan.

*Primary Examiner*—Joan H. Pendegrass
*Attorney, Agent, or Firm*—Sughrue, Mion, Zinn, Macpeak & Seas

[57] ABSTRACT

A photographic printer has an exposure station, in which a frame of a photographic film and color photographic paper are set. A light source is disposed in opposition to the color paper with reference to the photographic film set in the exposure station, and constituted by LED elements. The LED elements are disposed in a matrix for emitting light of red, green and blue colors. The light source illuminates the frame from behind. The color paper is exposed by the light transmitted through the frame, to print the frame recorded on the photographic film to the color paper. In a preferred embodiment, a drive signal is determined individually for driving respective the LED elements. The drive signal is applied to the respective LED elements.

32 Claims, 6 Drawing Sheets

PHOTOGRAPHIC PRINTER AND FILM SCANNER HAVING AN LED LIGHT SOURCE

BACKGROUND OF THE INVENTION

1. Field of the Invention

The present invention relates to a photographic printer and a film scanner. More particularly, the present invention relates to a photographic printer and a film scanner of which a light source is simplified and also illumination can be controlled with high precision.

2. Description Related to the Prior Art

A photographic printer incorporates a light source. A conventional light source for printing is a halogen lamp. Three-color filters, called light-adjusting filters or cut filters, are inserted into a printing light path, to adjust light amounts and spectral distribution of the printing light. Instead of the halogen lamp, JP-A (Japanese Patent Laid-open Publication No.) 57-179832 discloses a light source for a color printer inclusive of monochromatic cathode-ray tubes (CRTs) emitting Red, Green and Blue light. The illuminating brightness is changed to adjust the light amounts and light spectral distribution.

In the light source with a halogen lamp, light-adjusting filters or cut filters must be inserted in the printing light path, and are shifted by a shifter device which is inevitably incorporated in the printer. The shifter device requires precision, high speed and durability for the purpose of printing exposure with high precision, and conventionally has complexity in construction. There is a further problem in the use of the three adjusting filters, which have unwanted absorption between the filters, to make it complex to calculate set positions of filters. The halogen lamp also emits infrared rays or ultraviolet rays unnecessary for exposure. There is a problem in that additional filters are required also for eliminating the infrared rays or ultraviolet rays. Another problem is low efficiency in conversion of printing light. A lamp spending electric power of hundreds of watts is required. Capacity of a power source must be enlarged, to result in a disadvantage in structural design. When in use of the three CRTs for the Red, Green and Blue light disclosed in JP-A (Japanese Patent Laid-open Publication No.) 57-179832, even the change in the illuminating brightness inevitably enlarges and complicates the construction of the printer.

The photographic printer includes the filters, a printing lens, a black shutter, and other various optical elements. Each optical element may have characteristics varied between portions of the optical element. Unevenness in density or colors may take place on a print produced by way of the optical element. For example, the printing lens has such a characteristic that an amount of light transmitted through a peripheral portion is relatively small, to cause unevenness in density or colors. It would be possible to correct the unevenness by use of an additional optical element having a characteristic reverse to the uneven pattern, such as a parabola filter or a color filter. However the uneven pattern of the printing lens varies with the change in magnification at which the printing lens is set. In the printer of which the printing magnification is variable, plural filters are required in association with different magnifications. However it is actually difficult to practice the printer provided with the plural filters for eliminating unevenness.

SUMMARY OF THE INVENTION

In view of the foregoing problems, an object of the present invention is to provide a photographic printer and a film scanner of which a light source is simplified.

Another object of the present invention is to provide a photographic printer and a film scanner in which illumination of a light source can be controlled with high precision.

Still another object of the present invention is to provide a photographic printer and a film scanner in which unevenness derived from a printing lens or light source is prevented from affecting density or colors of a frame as illuminated.

In order to achieve the above and other objects and advantages of this invention, a photographic printer includes an exposure station in which the frame of the photographic film is set. A light source is disposed in opposition to the printing lens with reference to the photographic film set in the exposure station, and constituted by diode elements disposed in a matrix for emitting light of red, green and blue colors, the light source illuminating the frame from behind, the photosensitive material exposed by the light transmitted through the frame.

In a preferred embodiment, a diode driver is connected to respective the diode elements, for driving the diode elements by application of a drive signal thereto. A controller is connected to the diode driver, for controlling the diode elements via the diode driver, the controller determining the drive signal applied to respective diode elements by the diode driver.

A photo sensor unit is constituted by plural photo sensors arranged substantially on a common plane, for measuring the frame illuminated by the light source photometrically at minute regions, to obtain density of the frame in the three colors. A memory stores position data in which respective the diode elements are associated with one of the minute regions. The controller accesses the memory for reading the position data associated with the diode elements and for associating the read position data with the density measured by respective the photo sensors, to determine the density in association with respective the diode elements, the drive signal for the diode elements determined in accordance with the respective density.

A correcting data generator is connected to the controller, for predetermining information which associates illuminating brightness of the diode elements with the drive signal for driving the diode elements at the illuminating brightness, individually between the diode elements. The controller further corrects the drive signal in accordance with the associating information to illuminate at a target light amount.

In the present invention, a light source for a photographic printer and a film scanner can be remarkably simplified. Illumination of the light source can be controlled with high precision. Unevenness derived from a printing lens or light source is prevented from affecting density or colors of a frame as illuminated.

BRIEF DESCRIPTION OF THE DRAWINGS

The above objects and advantages of the present invention will become more apparent from the following detailed description when read in connection with the accompanying drawings, in which.

DETAILED DESCRIPTION OF THE PREFERRED EMBODIMENT(S) OF THE PRESENT INVENTION

Figure 1:
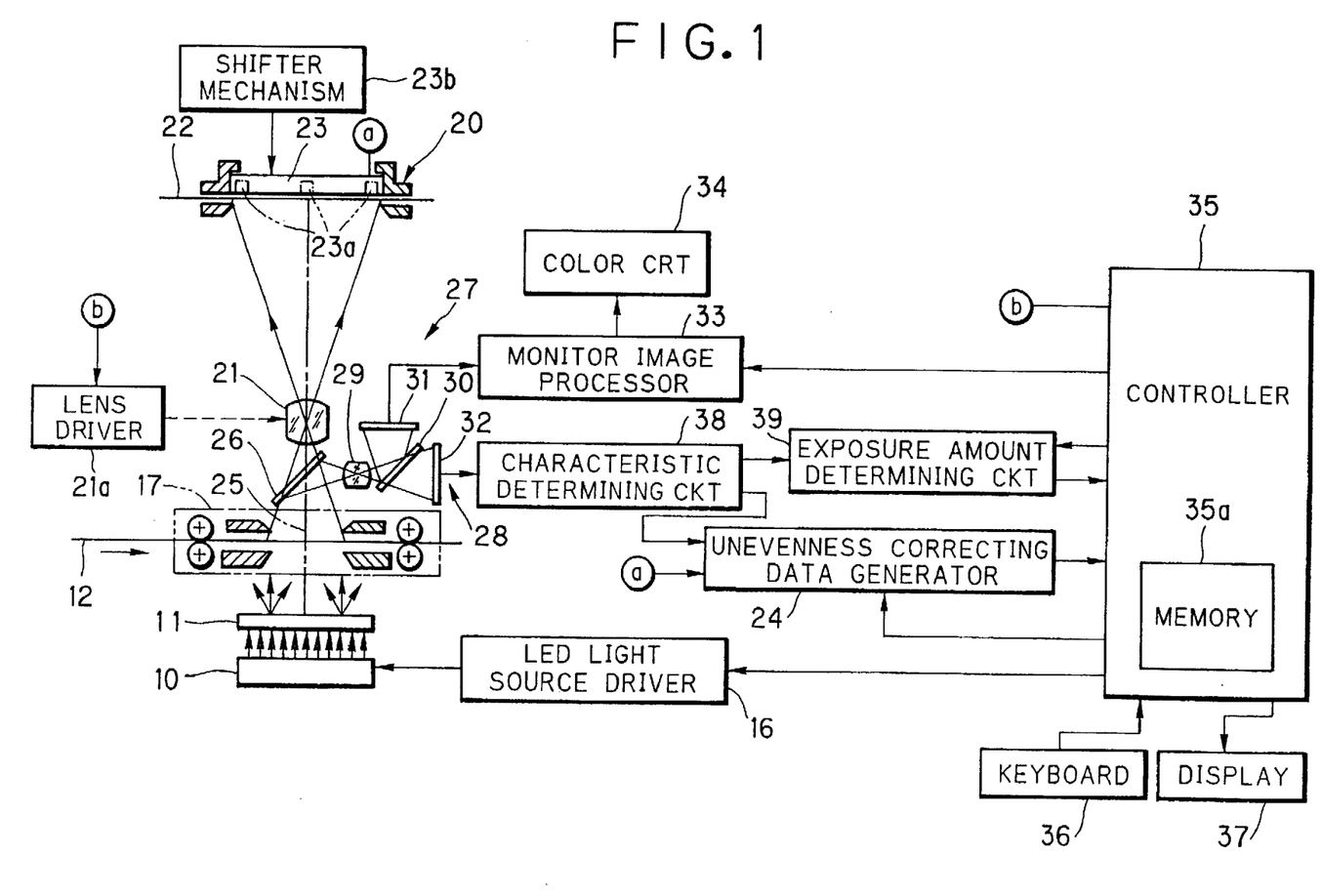
FIG. 1 is a schematic diagram illustrating a photographic printer of the present invention.
Figure 2:
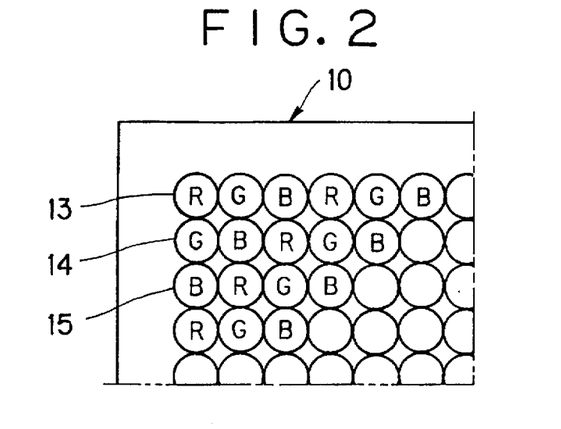
FIG. 2 is a plan view illustrating an LED light source in the photographic printer of FIG. 1.

In FIG. 1, a photographic printer is schematically illustrated. Light from an LED (light-emitting diode) light source 10 is diffused by a diffuser plate 11 sufficiently, and illuminates a designated one of negative frames recorded on a developed negative film 12. As illustrated in FIG. 2, the LED light source 10 is constituted by a great number of red LED elements 13, green LED elements 14 and blue LED elements 15, which are arranged in a form of a matrix and at equal intervals both horizontally and vertically. In FIG. 1, an LED driver 16 responds to drive data of illuminating brightness and drive time as generated by a controller 35, and drives the respective LED elements 13 to 15 at a given current and for the drive time.

The diffuser plate 11 is a glass plate, an opal glass plate or the like of which a surface is provided with minute projections or recesses, and diffuses light from the LED elements 13 to 15. The negative film 12 is set on a film carrier 17, which, as well-known in the art, detects an edge of the negative frame and sets the negative frame in a printing station.

Note that the space between the diffuser plate 11 and the negative film 12 is exaggerated in illustration of FIG. 1 for convenience, and is actually smaller than is shown.

The image of the negative frame to be printed is focussed by a printing lens 21 on to color photographic paper 22 set on a printing station, when the LED light source 10 is driven. The present embodiment lacks a black shutter conventionally used for control of exposure time, as the LED light source 10 is turned on and off with high speed by the LED driver 16. Note that, if the negative frame at the film carrier 17 to be printed is directly observed for inspection by an operator's eyes, a black shutter can be used for preventing the color paper 22 from being exposed.

In a paper holder 20 at the printing station, there is disposed a photometric panel 23 for correcting unevenness derived from the printing lens 21. The photometric panel 23 has five photometric sensors 23a, one at the center and the other four at the corners of the panel 23, for photometry of the printing light as passed through the printing lens 21. Measured amounts are sent to an unevenness correcting data generator 24, which calculates unevenness correcting data in association with unevenness of the printing lens 21. The photometric panel 23 has a shifting mechanism 23b, which shifts the photometric panel 23 so as to position sensor heads of the photometric sensors 23a at a level equal to a photosensitive surface of the color paper which would be positioned in the paper holder 20. Note that an image area sensor can be used instead of the photometric panel 23. The number and positions of the photometric sensors 23a can be changed suitably as desired.

A half mirror 26 is disposed in a printing light path 25 between the film carrier 17 and the printing lens 21, and splits the printing light both toward a monitor section 27 and toward a scanner section 28. The split light is focussed on a monitor color image area sensor 31 and a scanner color image area sensor 32 via a lens 29 and a half mirror 30. It is also possible instead of the half mirror 26 to use a half prism, or to dispose a mirror movable into and away from the printing light path 25. Note that a number of sensor cells constituting the monitor image area sensor 31 is greater than a total number of the LED elements 13 to 15, but may be smaller or equal as desired.

The monitor image area sensor 31 picks up the negative frame to be printed, and sends its video signal to a monitor image processor 33, which, as well known in the art, performs A/D conversion, negative/positive conversion, correction of gradation, correction of chroma, and the like, to cause a color CRT 34 to display a monitor image as simulation of a finished print. The chroma correction corrects a difference between a spectral sensitivity of the color paper 22 and a spectral sensitivity of the image area sensor 31, and also corrects the colors by adding manual correcting data into a simulated image if the manual correcting data are inputted. The manual correcting data are inputted by operating a keyboard 36 connected to the controller 35. The density correcting data and color correcting data are indicated on a display 37, and also sent to the monitor image processor 33.

The photometric image area sensor 32 photometrically measures every point in three-color separation in the negative frame to be printed. Photometric signals obtained from the photometric image area sensor 32 are sent into a characteristic determining circuit 38, which determines a large area transmittance density (LATD) value, maximum density, minimum density and the like, which are sent into an exposure amount determining circuit 39. The exposure amount determining circuit 39, having stored known equations for calculating exposure amounts, calculates the three-color exposure amounts, which are sent into the controller 35. Manual correcting data, if desired, are inputted through the keyboard 36, and used in calculation of the exposure amounts.

Figure 1A:
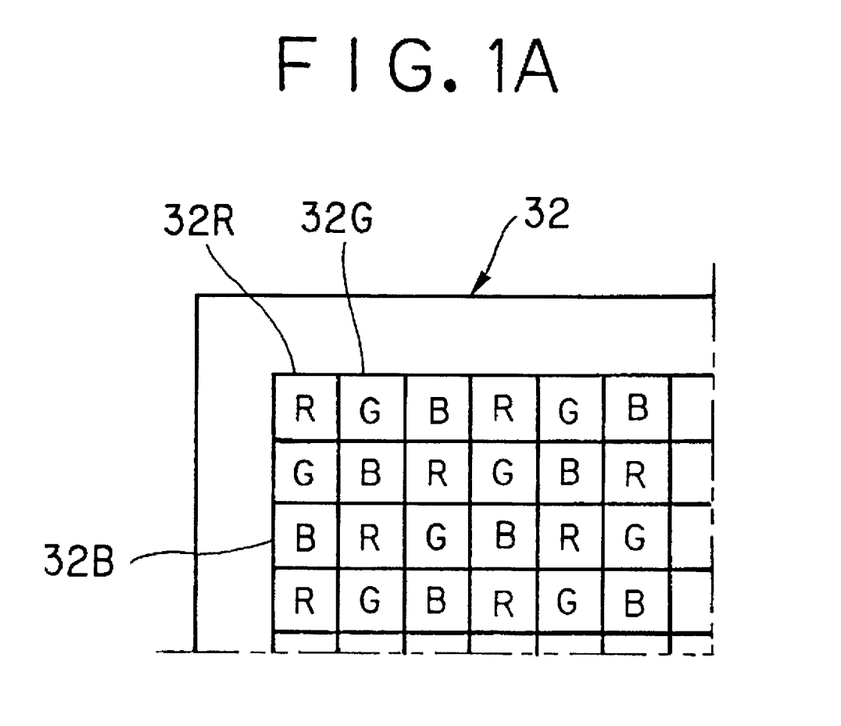
FIG. 1A is a partly broken plan view illustrating a color image sensor for photometry.

On the basis of three-color printing exposure amounts from the exposure amount determining circuit 39, the controller 35 determines illuminating brightness and drive time of the LED elements 13 to 15. A relationship between the printing exposure amounts and the LED illuminating brightness is predetermined as an LED calibration curve, which is stored in a memory 35a in form of a look-up table (LUT). The memory 35a also stores position data, in which the photometric points of cells 32R, 32G and 32B of the image area sensor 32 (See FIG. 1A) are associated with positions of the LED elements 13 to 15. The illuminating brightness and the drive time as determined through the look-up table are sent to the LED driver 16. If the drive signal requires changing in a range beyond a change of the illuminating brightness, the drive time is changed. The LED driver 16 previously stores a relationship between the illuminating brightness and the drive current. The LED driver 16 receives the data of the illuminating brightness and the drive time from the controller 35, and responsively determines the drive current and the drive time for the LED elements 13 to 15, so as to cause the LED elements 13 to 15 to illuminate at determined brightness and for a determined time, to effect an exposure.

The controller 35 also corrects unevenness of the light source and unevenness derived from the printing lens. The correcting data generator 24 receives characteristic values from the characteristic determining circuit 38, and responsively determines unevenness correcting data individually for brightness and drive time of the LED light source 10. The correcting data generator 24 also receives photometric data from the photometric panel 23, and responsively determines unevenness correcting data for each printing magnification determined for the printing lens 21 by the controller 35. Those correcting data are sent into the controller 35, and stored in the memory 35a. To obtain those correcting data, a developed unexposed negative film (not shown) is set in the film carrier 17. The developed unexposed negative film is one developed without having been exposed for any image.

In the unevenness correction for the light source 10, the characteristic determining circuit 38 receives color signals from the image area sensor 32 while the LED elements 13 to 15 are driven with a test drive signal equal among them. The characteristic determining circuit 38 responsively obtains density of respective points in three-color separation. The obtained density is sent to the unevenness correcting data generator 24. The correcting data generator 24 extracts maximum density from the plural points defined within a single frame. A number of differences between the maximum density and the density of the respective points are calculated, and sent to the controller 35 as correcting data, which is written into the memory 35a. The correcting data are determined for each of the three colors.

There is a phenomemon in which illuminating brightness of the LED elements 13 to 15 changes with drive time. When any of the LED elements 13 to 15 is driven to illuminate by a regular current and for a given time, there occurs a small increase or decrease in brightness. This increase or decrease is unevenness of brightness in relation to time, and derived from characteristics of each of the LED elements 13 to 15. To find the correlation, it is possible previously to plot a curve of change of the brightness with reference to the time by collecting data experimentally. A plurality of curves may be predetermined experimentally for various values of the initial brightness in a range between minimum brightness and maximum brightness between which the LED elements 13 to 15 may be driven. It is possible in printing density to correct the unevenness derived from the characteristics of the LED elements 13 to 15.

In the unevenness correction for the printing lens 21, the photometric panel 23 is shifted by the shifter mechanism 23b to have the level at which a photosensitive surface of the color paper 22, if set for exposure, would be positioned. The ratio of the light intensity at a peripheral portion of the printing lens 21 to the light intensity at a center of the printing lens 21 is obtained by the correcting data generator 24 for each value of the printing magnification, of which a magnification signal is generated by the controller 35 and at which a lens driver 21a responsively sets the printing lens 21. The ratio is stored in the memory 35a in the controller 35. To print an image, the LED elements 13 to 15 are driven in a pattern in reverse to the uneven characteristics. To be precise, a drive signal determined for an LED element is corrected as a relatively greater signal, according to the smallness in the brightness of the LED element. Drive signals determined for LED elements in peripheral portions are corrected as a greater signal than such for the central portion, according to the smallness in the light intensity ratio of the peripheral portions to the central portion.

The controller 35 controls the LED driver 16 in the photometry and the monitoring. The light amount of the LED light source 10 is optimized for the pick-up of the image area sensor 31 and for the photometry of the image area sensor 32. The illuminating brightness of the LED elements 13 to 15 for control of the light intensity is preset experimentally for the image area sensors 31 and 32. It is possible that the image area sensors 31 and 32 have different dynamic ranges. The illuminating brightness for control of the light intensity is preset differently for each of the image area sensors 31 and 32. At first the LED light source 10 is driven at brightness optimized for the monitor sensor 31, which picks up the negative frame. Next the LED light source 10 is driven at brightness optimized for the photometric sensor 32, which measures the negative frame.

The controller 35 receives the correcting data which the correcting data generator 24 has written to the memory 35a, and obtains data of illuminating brightness and drive time for the three-color LED elements 13 to 15 on the basis of the exposure amounts. Responsively the controller 35 determines illuminating brightness and drive time for all of the LED elements 13 to 15. The illuminating brightness and the drive time are sent to the LED driver 16 as drive signal. Upon entry of a printing command through a printing key, the LED driver 16 drives the color LED elements 13 to 15 to illuminate at the determined brightness and for the determined time, for exposure.

Figure 3:
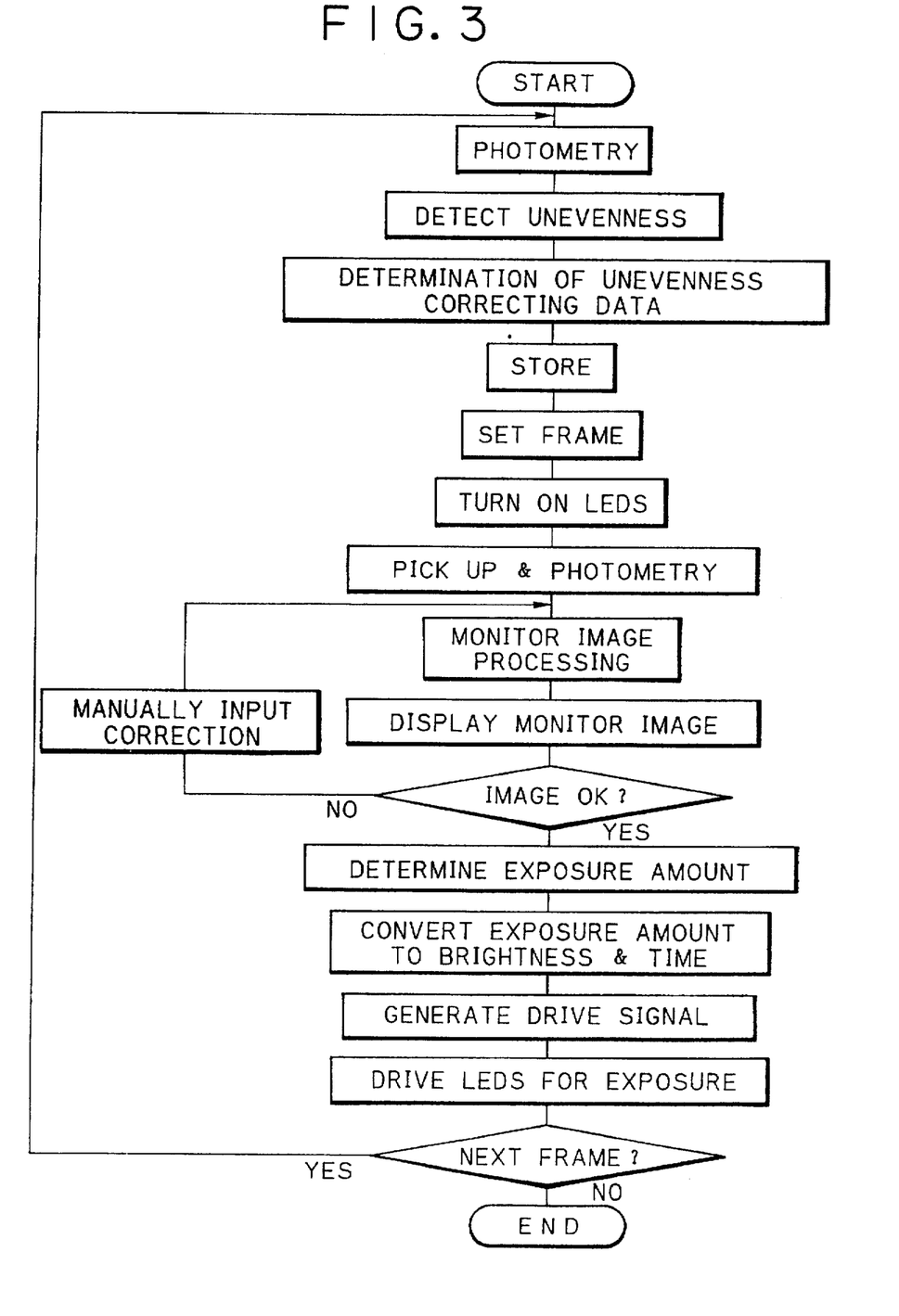
FIG. 3 is a flow chart illustrating a sequence of operation of the printer.

Operation of the embodiment is described now with reference to FIG. 3. Prior to exposure, the keyboard 36 is operated to have the controller 35 enter the correcting data determining mode. The correcting data are obtained for unevenness of the light source and for unevenness derived from the printing lens 21. The correcting data is written to the memory 35a of the controller 35. The correcting data is stored to the memory 35a with an address of the printing magnification and the exposure time and for each of the LED elements 13 to 15. It is possible to eliminate determination of the correcting data before a time of exposure. Periodical determination of the correcting data is sufficient in course of successive use of the printer.

The negative film 12 is set in the film carrier 17. A frame transporting key on the keyboard 36 is depressed. The film carrier 17 transports the negative film 12 to set the negative frame on a printing station to be printed. To set the negative frame, an edge of the negative frame is optically detected as well known in the art. The frame to be printed is illuminated by the LED light source 10, of which the illumination is being controlled by the controller 35 to optimize the light spectral distribution and light intensity in view of dynamic ranges of the image area sensors 31 and 32 for the purpose of the pick-up and photometry. Then the correcting data for the unevenness of the light source is read out of the memory 35a, and combined with the drive data, to be the drive signal for driving the LED elements 13 to 15, so that the printing light is evenly regulated.

The monitor image area sensor 31 picks up the negative frame, of which the video signal is converted digitally, converted from negative to positive, corrected in the gradation, and corrected in the chroma, all by the monitor image processor 33. The monitor image in simulation of the finished print is indicated on the color CRT 34. If it is judged through observation of the monitor image that the density or color should be corrected, manual correcting data are inputted through the keyboard 36. The manual correcting data as inputted is sent via the controller 35 to the monitor image processor 33, which corrects the monitor image according to the correcting data, and has the color CRT 34 indicate the monitor image after the correction.

The monitor image is visually checked. If it is unacceptable and further correction is required, then other manual correcting data is inputted similarly. If the image is acceptable, the printing key in the keyboard 36 is depressed to start printing the image. In the embodiment, the controller 35 causes the monitor image processor 33 to take the manual correcting data into consideration in displaying the monitor image. It is alternatively possible for the controller 35 to change the drive data in combination with the manual correcting data, so that the light intensity and spectral distribution of the LED light source 10 can be changed. This also enables the monitor CRT 34 to display the simulated image after the manual correction.

The printing command key is operated. The manual correcting data inputted are rendered effective. The manual correcting data and the various characteristics are entered to the exposure amount determining circuit 39, which, having stored the known exposure amount calculating equations, calculates three-color exposure amounts. The exposure amounts are sent into the controller 35. The controller 35 refers to the correcting data from the memory 35a in association with the exposure time from the exposure determining circuit 39 and the printing magnification of the printing lens 21. The two correcting data are added up to obtain a sum as total unevenness correcting data. To the data of the illuminating brightness and the drive time determined from the exposure amounts of the exposure determining circuit 39, the total correcting data is added, to determine final data of the illuminating brightness and the drive time for the LED elements 13 to 15. The final data is sent to the LED driver 16. The LED driver 16 drives the LED elements 13 to 15 to illuminate at the illuminating brightness and the drive time as determined by the controller 35, to illuminate the negative frame, which is focussed on the color paper 22 for printing. All the unevenness derived from the printing magnification and the exposure time is eliminated for each LED element and at its illuminating brightness and drive time. It is possible to obtain a good print without any unevenness in color or density.

To change the gradation characteristics of a finished print, image density is spot-metered by the photometric image area sensor 32 at minute regions in the image. According to the image density of each minute region, illuminating brightness and the drive time are determined for each LED element 13 to 15 associated with the minute regions. To change the gradation characteristics for an excessively over-exposed frame or an excessively under-exposed frame, an over-exposed or under-exposed extent of the frame is evaluated from the photometric value of the photometric image area sensor 32. The illuminating brightness and the drive time for the associated LED elements 13 to 15 are changed at an amount predetermined with the evaluated extent.

In the above embodiment, the drive time and the illuminating brightness are changed to control an exposure. Further, it is possible in the present invention to change the number of LED elements to be driven among all of the LED elements 13 to 15 for controlling an exposure. This also enables the printer to produce a good print. It is further possible in the printer to change the number of LED elements to be driven, in combination with the drive time and the illuminating brightness.

Figure 4:
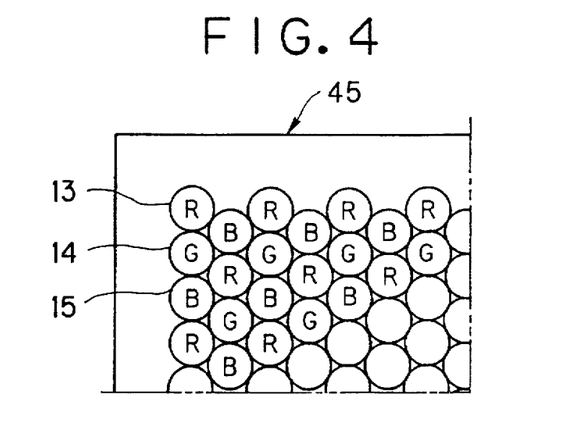
FIG. 4 is a plan view illustrating another preferred LED light source.

In the above embodiment, the LED elements 13 to 15 in the matrix in FIG. 2 are disposed at the equal intervals vertically and horizontally. Alternatively the LED elements 13 to 15 as an LED light source 45 can be so arranged that each LED element is surrounded by other six ones, as illustrated in FIG. 4. This is favorable in raising a mounting density of the LED elements 13 to 15, as the LED elements may have a columnar or hexagonal form.

Figure 5:
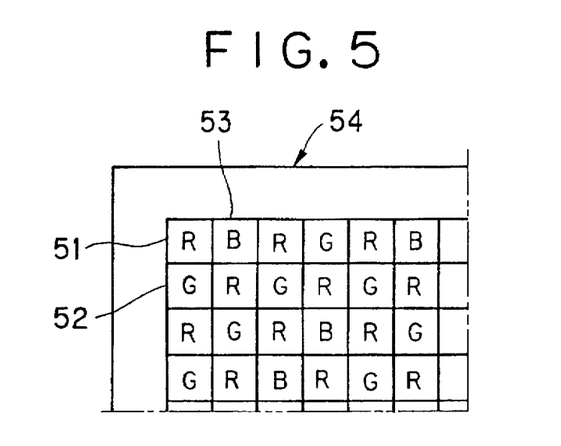
FIG. 5 is a plan view illustrating still another preferred LED light source.

In the above embodiment, the numbers of LED elements 13 to 15 are equal between the Red, Green and Blue colors. Alternatively it is possible to change the numbers of LED elements 13 to 15 between the three colors. The numbers of LED elements for the colors can be optimized in association with the distribution of the sensitivity of the color paper 22. In FIG. 5, an LED light source 54 has Red, Green and Blue LED elements 51 to 53 at the proportion of 3:2:1, which is consistent to the sensitivity distribution of the color paper 22. Those LED elements 51 to 53 are patterned regularly. It is possible to arrange the LED elements in different fashion from the pattern of FIG. 5. In the embodiment, the LED elements 51 to 53 have a rectangular shape, which can raise mounting density of the LED elements.

Figure 6:
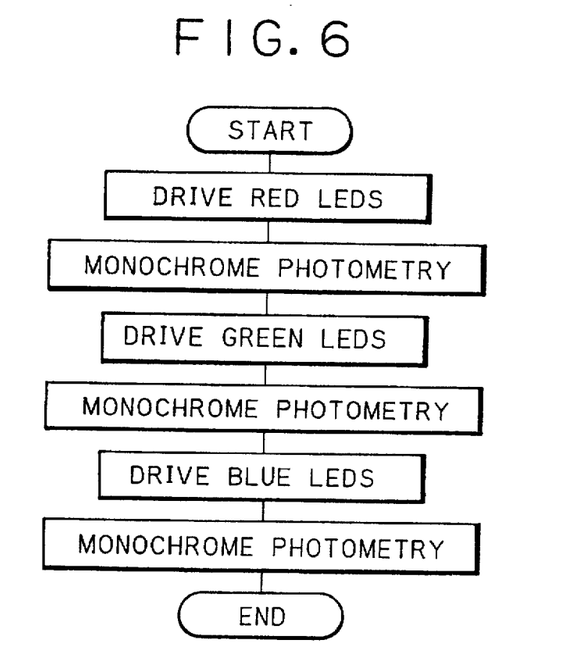
FIG. 6 is a flow chart illustrating a sequence of photometry through a monochromatic image area sensor.

Instead of the color image area sensors 31 and 32, a monochromatic image area sensor can be used for pick-up and photometry of a negative frame. It is possible to drive only the LED elements 13, 14 or 15 of one of the three colors, and to pick up or measure the image in synchronism with the drive of the one-color LED elements. Similar operation can be repeated for the remaining colors. FIG. 6 illustrates those steps according to the embodiment. Of course, the spectral distribution of the LED elements as previously measured can be used to calculate an exposure amount optimized for printing.

In the photometry, the image area sensor may be replaced with a photo diode as a light-receiver of an LATD type, namely the transmitted light through the whole negative frame is measured by a single point of photometry. The LED elements may be driven time-sequentially in a regular pattern. Divisional areas, included in a frame and defined by instantaneously driven LED elements, may be measured to obtain transmittance density. The areas or positions in the frame can be measured photometrically.

Figure 7:
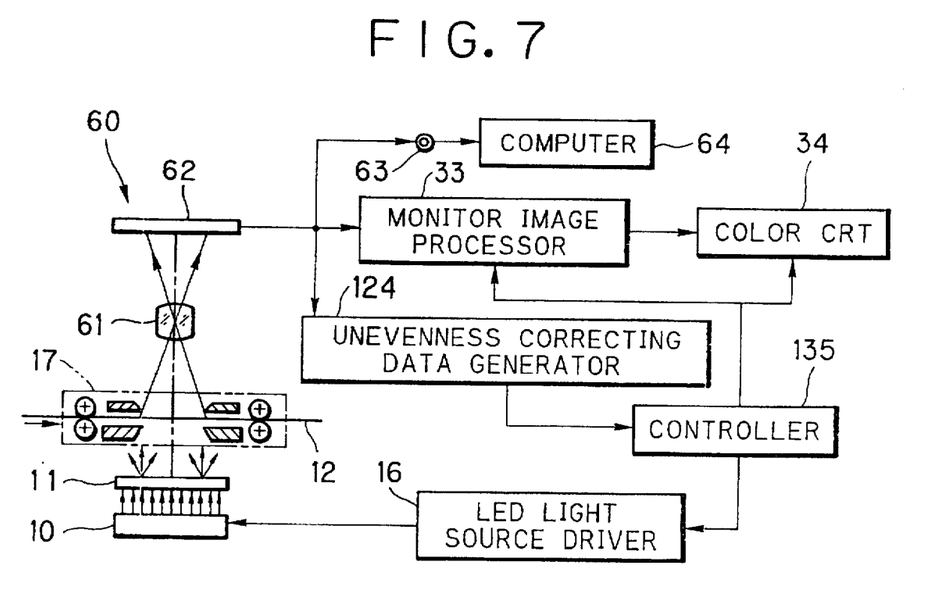
FIG. 7 is a schematic diagram illustrating a film scanner of the present invention.

In the above embodiments, the photographic printer incorporates the LED light source 10. Furthermore, a film scanner 60 can incorporate the LED light source 10 as illustrated in FIG. 7. Elements similar to those of the embodiment of FIG. 1 are designated with identical reference numerals. The film scanner 60 includes an image area sensor 62, which picks up the negative frame on the negative film 12 via a lens 61. Pick-up data is sent into the monitor image processor 33 and a computer 64 connected via an output terminal 63. The LED light source 10 is constituted by a great number of the LED elements 13 to 15 disposed in a matrix, which is favorable in shortening the pick-up time. A dynamic range and a characteristic curve of the image area sensor 62 are previously memorized. The illuminating brightness and the drive time for the LED elements 13 to 15 are so controlled in association with the minute regions in the negative frame, that the drive signal does not go beyond the dynamic range or that the characteristic curve is shaped straight. Therefore the image data and the monitor image can be obtained in good condition. As is similar to the former embodiments, the unevenness of brightness of the LED light source 10 is photometrically measured to obtain unevenness correcting data in a correcting data generator 124, before main photometry for negative frames. A controller 135, in response to the correcting data, corrects the unevenness of the LED light source 10.

It is also preferable to use the spectral density distribution of the whole of the negative frame or of a designated divisional area of the negative frame, for controlling the illuminating brightness and drive time of LED elements associated with the whole area of the negative frame, or of LED elements associated with divisional areas of the negative frame other than the designated divisional area. It is possible in the monitor CRT to simulate a principal subject and its background as photographed in a negative frame with higher fidelity. It is also possible to create better image data. If necessitated, the unevenness derived from the lens 61 can be corrected.

It is possible in a photographic printer or a film scanner to synthesize letters or a caption and/or a computer-graphic (CG) image with an original image by controlling the LED elements individually. For this operation, the color paper can be exposed for the second time following the exposure of the original image, and with the printing lens 21 focussed at the diffusing plate 11. The image synthesis is favorably facilitated, as it does not require any of lithographic film, liquid crystal display panel, and the like.

When prints are produced sequentially from a negative film having full size frames and panoramic frames in mixture, it is preferred to illuminate through LED elements associated with designated areas corresponding to the frame sizes. The color paper can be partially exposed. Even with the negative film having both the full size frames and the panoramic frames, prints can be produced efficiently by the virtue of the simplified construction of the printer. When letters or a caption as desired is printed, the operation is efficient with the simple construction.

Figure 8:
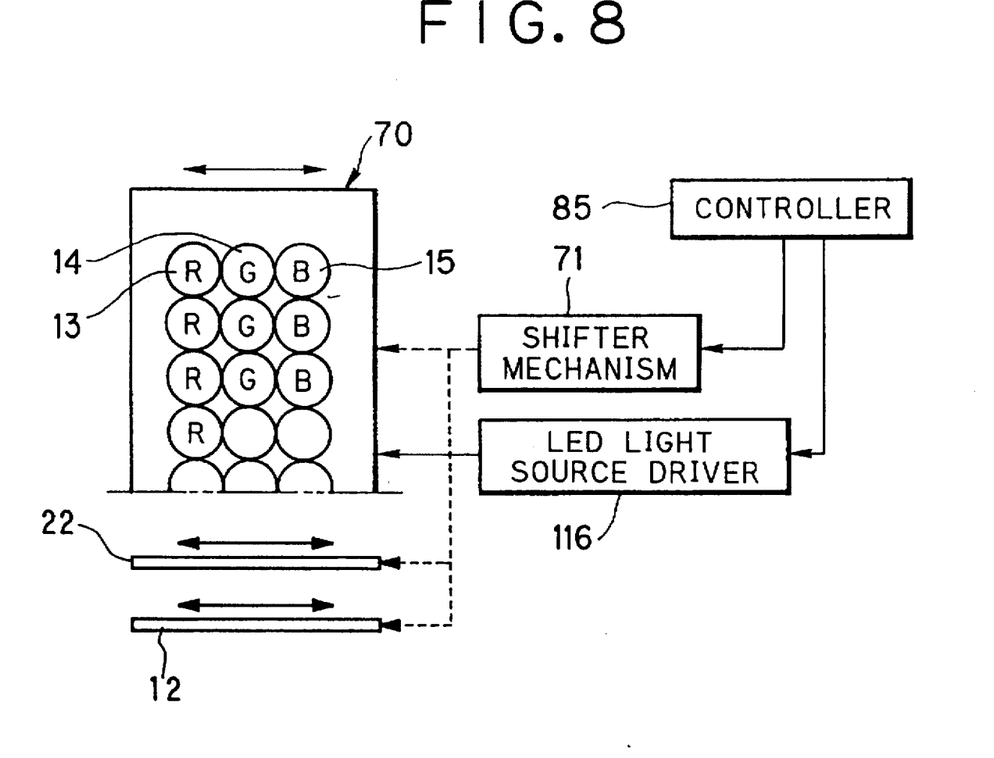
FIG. 8 is a plan view illustrating an LED light source of an embodiment where the LED light source is moved crosswise to its longtitudinal direction.
Figure 9:
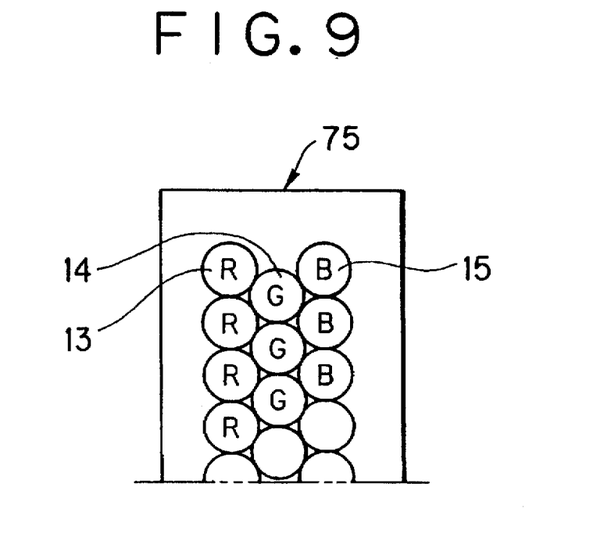
FIG. 9 is a plan view illustrating an LED light source of another preferred embodiment.

Instead of arranging the LED elements in the matrix to constitute the LED light source, it is possible to use an LED light source 70 in FIG. 8, which has the three-color LED elements 13 to 15, with a single line associated with each color. A shifter device 71 is adapted to shifting the LED light source 70. The LED light source 70 is moved by the shifter device 71 relatively with the color paper in a direction perpendicular to the arrangement of the LED elements. The whole of the negative frame is scanned by the LED light source 70, so that the pick-up, photometry and printing is possible. It is also possible, as illustrated in FIG. 9, that an LED light source 75 is constituted of the LED elements 13 to 15 disposed in a zigzag. The mounting density of the LED elements 13 to 15 can be raised.

Note that, instead of the LED light source 70 shifted, the color paper together with the negative film may be shifted by a shifter device, as shown in FIG. 8 by the dashed line connecting shifter mechanism 71 with color paper 22 and negative film 12.

In any of the above embodiments, the LED elements 13 to 15 constitute the light source. Alternatively laser diodes, namely laser semiconductors, may be used as light source. The above embodiments are applied to the photographic printer of a type which is used in a small scale photo-lab and with which the negative frames are inspected before each print is produced. The present invention is also applicable to a photographic printer of a type which is used in a large scale photo-lab and with which all the negative frames are inspected before starting printing on the basis of data from the inspection.

In the above embodiments, the controller 35 determines data of illuminating brightness and drive time for the three-color LED elements. Instead, it is possible for the exposure amount determining circuit 39 to determine the data of illuminating brightness and drive time.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A photographic printer for printing a frame recorded on photographic film to photosensitive material through a printing lens, comprising:

an exposure station in which said frame of said photographic film is set;

a light source, disposed in opposition to said printing lens with reference to said photographic film set in said exposure station, and constituted by diode elements disposed in a matrix for emitting light of red, green and blue colors, said light source illuminating said frame from behind, said photosensitive material exposed by said light transmitted through said frame;

a diode driver, connected to respective said diode elements, for driving said diode elements by application of a drive signal thereto;

a controller, connected to said diode driver, for controlling said diode elements via said diode driver, said controller determining said drive signal applied to respective said diode elements by said diode driver; and a correcting data generator, connected to said controller, for predetermining information which associates illuminating brightness of said diode elements with said drive signal for driving said diode elements at said illuminating brightness, individually between said diode elements, said controller correcting said drive signal in accordance with said associating information to illuminate at a target light amount.

2. A photographic printer as defined in claim 1, wherein said diode elements are so arranged that diode elements of an Nth line of said matrix are alternate with diode elements of an (N+1)th line of said matrix, said (N+1)th line arranged adjacently to said Nth line.

3. A photographic printer as defined in claim 1, wherein said diode elements are arranged at equal intervals vertically and horizontally.

4. A photographic printer as defined in claim 3, wherein numbers of said red, green and blue diode elements are determined at a proportion of 3:2:1.

5. A photographic printer as defined in claim 1, wherein said drive signal for respective said diode elements is determined to change spectral distribution and light amount of printing light emitted by said light source.

6. A photographic printer as defined in claim 1, wherein said drive signal for respective said diode elements represents either or combination of illuminating brightness and drive time thereof, and/or said controller changes a number of diode elements driven selectively among said diode elements.

7. A photographic printer as defined in claim 1, wherein said controller turns off ones of said diode elements located outside a previously designated area, to effect printing through ones of said diode elements located in said designated area.

8. A photographic printer as defined in claim 1, further comprising a photo sensor unit, constituted by plural photo sensors arranged substantially on a common plane, for measuring printing light emitted by said light source photometrically at minute regions, said controller causing said diode driver to apply a regular test drive signal to respective said diode elements, said photo sensor unit generating density signals at said minute regions in said three colors in response to said printing light associated with said regular test drive signal;

wherein said correcting data generator compares said density signals of said printing light at said minute regions with one another, and thereby produces first unevenness correcting data of which an address is said minute regions and which is associated with grades of said density signals of said printing light to be said associating information;

further comprising a memory for storing said first unevenness correcting data from said correcting data generator, and for storing position data in which respective said diode elements are associated with one of said minute regions;

wherein said controller accesses said memory for reading said position data associated with said diode elements and for reading said first unevenness correcting data associated with said read position data, said drive signal corrected according to said first unevenness correcting data, said drive signal of respective said diode elements corrected to a relatively greater signal according to greatness of said density signal of said printing light from respective said diode elements, said diode elements driven at said target light amount.

9. A photographic printer as defined in claim 8, wherein said density signals of said printing light in said three colors are obtained by measuring a developed unexposed negative film set in said exposure station.

10. A photographic printer as defined in claim 9, wherein said correcting data generator, in determining said first unevenness correcting data, changes said first unevenness correcting data in accordance with a length of drive time of said diode elements; and said controller, in reading said first unevenness correcting data, takes said drive time into further consideration.

11. A photographic printer as defined in claim 9, further comprising:

a lens driver, connected to said controller, for driving said printing lens, said lens driver provided by said controller with information of printing magnification, for setting said printing lens at said printing magnification;

wherein said correcting data generator evaluates said printing light in accordance with light amounts of said printing light at a central portion and a peripheral portion of said printing lens, and thereby produces second unevenness correcting data of which an address is said printing magnification, said second unevenness correcting data determined such as to correct said drive signal of ones of said diode elements associated with said peripheral portion to a relatively greater signal according to smallness of a proportion of said light amount of said peripheral portion to said light amount of said central portion at said printing magnification, said second unevenness correcting data adapted to eliminating unevenness in said printing light between said portions of said printing lens;

wherein said memory further stores said second unevenness correcting data from said correcting data generator; and wherein said controller accesses said memory at said address of said printing magnification, said second unevenness correcting data read and combined with said first unevenness correcting data to calculate total unevenness correcting data, said drive signal corrected in consideration of said total unevenness correcting data.

12. A photographic printer as defined in claim 11, further comprising:

a photosensitive material holder, which is disposed at said exposure station, and in which said photosensitive material is set;

a film carrier, disposed at said exposure station, for supporting said photographic film, said frame set in said film carrier;

a central photo sensor, disposed in said photosensitive material holder in association with said central portion of said printing lens, for photometrically measuring a developed unexposed negative film set in said film carrier, to obtain said light amount of said printing light at said central portion after passage through said printing lens; and at least one peripheral photo sensor, disposed in said photosensitive material holder in association with said peripheral portion of said printing lens, for photometrically measuring said developed unexposed negative film set in said film carrier, to obtain said light amount of said printing light at said peripheral portion after passage through said printing lens, said light amount at said peripheral portion supplied for said correcting data generator together with said light amount at said central portion from said central photo sensor.

13. A photographic printer for printing a frame recorded on photographic film to photosensitive material through a printing lens, comprising:

an exposure station in which said frame of said photographic film is set;

a light source, disposed in opposition to said printing lens with reference to said photographic film set in said exposure station, and constituted by diode elements disposed in a matrix for emitting light of red, green and blue colors, said light source illuminating said frame from behind, said photosensitive material exposed by said light transmitted through said frame;

a diode driver, connected to respective said diode elements, for driving said diode elements by application of a drive signal thereto; and a controller, connected to said diode driver, for controlling said diode elements via said diode driver, said controller determining said drive signal applied to respective said diode elements by said diode driver, wherein said controller determines a further drive signal in accordance with data of letters or a computer-graphic image, and said diode driver applies said further drive signal to respective said diode elements, to print said letters or said computer-graphic image to said photosensitive material.

14. A photographic printer for printing a frame recorded on photographic film to photosensitive material through a printing lens, comprising:

an exposure station in which said frame of said photographic film is set;

a light source, disposed in opposition to said printing lens with reference to said photographic film set in said exposure station, and constituted by diode elements disposed in a matrix for emitting light of red, green and blue colors, said light source illuminating said frame from behind, said photosensitive material exposed by said light transmitted through said frame;

a diode driver, connected to respective said diode elements, for driving said diode elements by application of a drive signal thereto;

a controller, connected to said diode driver, for controlling said diode elements via said diode driver, said controller determining said drive signal applied to respective said diode elements by said diode driver;

a photo sensor unit, constituted by plural photo sensors arranged substantially on a common plane, for measuring said frame illuminated by said light source photometrically at minute regions, to obtain density of said frame in said three colors; and a memory for storing position data in which respective said diode elements are associated with one of said minute regions, wherein said controller accesses said memory for reading said position data associated with said diode elements and for associating said read position data with said density measured by respective said photo sensors, to determine said density in association with respective said diode elements, said drive signal for said diode elements determined in accordance with respective said density, and wherein said controller determines said drive signal, for adjusting printing light emitted by said light source, at spectral distribution and light intensity suitably for photometry of said photo sensor unit.

15. A photographic printer as defined in claim 14, wherein said controller further evaluates said density of respective said minute regions obtained by said photo sensor unit for said frame to be printed, to detect over-exposed or under-exposed photographed states of said frame; and changes illuminating brightness and drive time of respective said diode elements by preset amounts, in accordance with said exposed states detected from said frame, to change gradation at which said frame is printed on said photosensitive material.

16. A photographic printer for printing a frame recorded on photographic film to photosensitive material through a printing lens, comprising:

an exposure station in which said frame of said photographic film is set;

a light source, disposed in opposition to said printing lens with reference to said photographic film set in said exposure station, and constituted by diode elements disposed in a matrix for emitting light of red, green and blue colors, said light source illuminating said frame from behind, said photosensitive material exposed by said light transmitted through said frame;

a diode driver, connected to respective said diode elements, for driving said diode elements by application of a drive signal thereto;

a controller, connected to said diode driver, for controlling said diode elements via said diode driver, said controller determining said drive signal applied to respective said diode elements by said diode driver, said controller causing said diode elements to illuminate in one color after another among said three colors; and at least one photo sensor for photometrically measuring or picking up said frame illuminated in one color after another by said diode elements, to effect three-color sequential photometry or pick-up.

17. A photographic printer as defined in claim 16, wherein said photo sensor is a monochromatic image area sensor.

18. A photographic for printing a frame recorded on photographic film to photosensitive material through a printing lens, comprising:

an exposure station in which said frame of said photographic film is set;

a light source, disposed in opposition to said printing lens with reference to said photographic film set in said exposure station, and constituted by diode elements disposed in a matrix for emitting light of red, green and blue colors, said light source illuminating said frame from behind, said photosensitive material exposed by said light transmitted through said frame;

a diode driver, connected to respective said diode elements, for driving said diode elements by application of a drive signal thereto;

a controller, connected to said diode driver, for controlling said diode elements via said diode driver, said controller determining said drive signal applied to respective said diode elements by said diode driver;

a photo sensor unit, constituted by plural photo sensors arranged substantially on a common plane, for picking up said frame illuminated by said light source, to obtain a video signal;

an image processor, connected to said photo sensor unit, for converting said video signal of said frame from negative to positive, and for correcting said video signal of said frame; and a display device, connected to said image processor, for displaying a positive image of said frame in accordance with said video signal after said conversion and said correction, to simulate a finished print, wherein said controller determines said drive signal, for adjusting printing light emitted by said light source, at spectral distribution and light intensity suitably for pickup of said photo sensor unit.

19. A photographic printer for printing a frame recorded on photographic film to photosensitive material, comprising:

a photosensitive material holder in which said photosensitive material is set;

a film carrier for supporting said photographic film, said frame set in said film carrier;

a light source, disposed in opposition to said photosensitive material holder with reference to said film carrier, and constituted by diode elements arranged linearly in a width direction of said photographic film, said diode elements emitting light of red, green and blue colors, said light source illuminating said frame from behind;

a diode driver, connected to respective said diode elements, for driving said diode elements by application of a drive signal thereto;

a shifter device, for shifting either said light source or said photosensitive material and said photographic film, in a direction perpendicular to arrangement of said diode elements; and a controller, connected to said diode driver and said shifter device, for determining said drive signal applied to respective said diode elements by said diode driver, for controlling said diode driver, and for driving said shifter device in synchronism with driving of respective said diode elements, said frame illuminated by said light source in linear fashion, said photosensitive material exposed by said light transmitted through said frame.

20. A photographic printer as defined in claim 19, wherein said drive signal for respective said diode elements represents either or combination of illuminating brightness and drive time thereof, and/or said controller changes a number of diode elements driven selectively among said diode elements.

21. A photographic printer as defined in claim 19, wherein red ones, green ones, and blue ones of said diode elements are arranged in respective single lines, and said single lines are arranged adjacently to dispose said diode elements in a matrix.

22. A photographic printer as defined in claim 21, wherein said diode elements are so arranged that diode elements of an Nth line of said matrix are alternate with diode elements of an (N+1)th line of said matrix, said (N+1)th line arranged adjacently to said Nth line.

23. A photographic printer as defined in claim 19, wherein said controller determines a further drive signal in accordance with data of letters or a computer-graphic image, and said diode driver applies said further drive signal to respective said diode elements, to print said letters or said computer-graphic image to said photosensitive material.

24. A photographic printer as defined in claim 19, wherein said controller turns off ones of said diode elements located outside a previously designated area, to effect printing through ones of said diode elements located in said designated area.

25. A photographic printer as defined in claim 19, further comprising:
    a correcting data generator, connected to said controller, for predetermining information which associates illuminating brightness of said diode elements with said drive signal for driving said diode elements at said illuminating brightness, individually between said diode elements; and
    said controller further corrects said drive signal in accordance with said associating information to illuminate at a target light amount.

26. A photographic printer as defined in claim 25, further comprising a photo sensor unit, constituted by plural photo sensors arranged substantially on a common plane, for measuring printing light emitted by said light source photometrically at minute regions, said controller causing said diode driver to apply a regular test drive signal to respective said diode elements, said photo sensor unit generating density signals at said minute regions in said three colors in response to said printing light associated with said regular test drive signal;
    wherein said correcting data generator compares said density signals of said printing light at said minute regions with one another, and thereby produces first unevenness correcting data of which an address is said minute regions and which is associated with grades of said density signals of said printing light to be said associating information;
    further comprising a memory for storing said first unevenness correcting data from said correcting data generator, and for storing position data in which respective said diode elements are associated with one of said minute regions;
    wherein said controller accesses said memory for reading said position data associated with said diode elements and for reading said first unevenness correcting data associated with said read position data, said drive signal corrected according to said first unevenness correcting data, said drive signal of respective said diode elements corrected to a relatively greater signal according to greatness of said density signal of said printing light from respective said diode elements, said diode elements driven at said target light amount.

27. A film analyzer for effecting photometry of a frame recorded on photographic film, comprising:
    a film carrier in which said frame of said photographic film is set;
    a light source, constituted by diode elements disposed in a matrix for emitting light of red, green and blue colors, said light source illuminating said frame set in said film carrier;
    a photo sensor unit, constituted by plural photo sensors arranged substantially on a common plane, for detecting said light transmitted through said frame illuminated by said light source;
    a diode driver, connected to respective said diode elements, for driving said diode elements by application of a drive signal thereto;
    a controller, connected to said diode driver, for controlling said diode elements via said diode driver, said controller determining said drive signal applied to respective said diode elements by said diode driver; and
    a correcting data generator, connected to said controller, for predetermining information which associates illuminating brightness of said diode elements with said drive signal for driving said diode elements at said illuminating brightness, individually between said diode elements,
    said controller correcting said drive signal in accordance with said associating information to illuminate at a target light amount.

28. A photographic printing method of printing a frame recorded on photographic film to photosensitive material through a printing lens, comprising steps of:
    setting said frame of said photographic film and said photosensitive material in an exposure station;
    disposing diode elements in a matrix for emitting light of red, green and blue colors, in opposition to said printing lens with reference to said photographic film set in said exposure station, to constitute a light source;
    driving said diode elements by application of a drive signal thereto;
    determining said drive signal applied to respective said diode elements;
    predetermining information which associates illuminating brightness of said diode elements with said drive signal for driving said diode elements at said illuminating brightness, individually between said diode elements,
    correcting said drive signal in accordance with said associating information; and
    illuminating said frame with said light source from behind, said photosensitive material being exposed by said light transmitted through said frame.

29. A photographic printing method as defined in claim 28, further comprising steps of:
    determining a drive signal individually for driving respective said diode elements; and
    applying said drive signal to respective said diode elements.

30. A photographic printing method as defined in claim 29, further comprising steps of:
    measuring said frame illuminated by said light source photometrically at minute regions, to obtain a first density signal of said frame in said three colors;
    reading position data in association with said diode elements, said position data predetermined to associate respective said diode elements with one of said minute regions;
    associating said read position data with said first density signal of said minute regions, to determine said first density signal in association with said diode elements;
    determining said drive signal for said diode elements in accordance with respective said first density signal, said light source adjusted to correct gradation;
    applying a regular test drive signal to respective said diode elements;
    measuring printing light, emitted by said light source with said regular test drive signal, photometrically at minute regions, to generate second density signals;

comparing said second density signals of said printing light at said minute regions with one another, thereby to produce unevenness correcting data of which an address is said minute regions and which is associated with grades of said second density signals of said printing light;

reading said unevenness correcting data associated with said position data read in association with said diode elements; and correcting said drive signal for said diode elements according to said unevenness correcting data associated therewith, said drive signal of respective said diode elements corrected to a relatively greater signal according to greatness of said second density signals of said printing light from respective said diode elements, said diode elements driven at a target light amount.

31. A photographic printing method of printing a frame recorded on photographic film to photosensitive material, comprising steps of:

linearly arranging diode elements for emitting light of red, green and blue colors, to constitute a light source;

applying an individually determined drive signal to respective said diode elements, to drive said diode elements;

shifting either said light source or said photosensitive material and said photographic film, in a direction perpendicular to arrangement of said diode elements, in synchronism with driving of respective said diode elements, said frame illuminated by said light source shifted relatively, said photosensitive material exposed by said light transmitted through said frame.

32. A film inspecting method of effecting photometry of a frame recorded on photographic film, comprising steps of:

disposing diode elements in a matrix for emitting light of red, green and blue colors, to constitute a light source;

applying a drive signal to respective said diode elements, to illuminate said frame, said drive signal determined individually for respective said diode elements;

measuring at an image area sensor said light transmitted through said frame illuminated by said light source;

predetermining information, using image area sensor measurements, which associates illuminating brightness of said diode elements with said drive signal for driving said diode elements at said illuminating brightness, individually between said diode elements; and correcting said drive signal in accordance with said associating information to illuminate at a target light amount.

* * * * *